US006535135B1

(12) United States Patent
French et al.

(10) Patent No.: US 6,535,135 B1
(45) Date of Patent: Mar. 18, 2003

(54) BEARING WITH WIRELESS SELF-POWERED SENSOR UNIT

(75) Inventors: Michael L. French, Uniontown, OH (US); Khan M. Iftekharuddin, Fargo, ND (US); David R. Leeper, Canton, OH (US); Ram P. Samy, Canton, OH (US); Wen-Ruey Hwang, North Canton, OH (US)

(73) Assignee: The Timken Company, Canton, OH (US)

( * ) Notice: Subject to any disclaimer, the term of this patent is extended or adjusted under 35 U.S.C. 154(b) by 236 days.

(21) Appl. No.: 09/603,294

(22) Filed: Jun. 23, 2000

(51) Int. Cl.⁷ .............................................. G08B 21/00
(52) U.S. Cl. ...................... 340/682; 73/53.05; 384/459
(58) Field of Search ...................... 340/870.17, 870.26, 340/870.3, 682, 631, 632; 324/1.73, 207.25; 384/446, 448, 459, 626; 73/53.01, 53.05, 54.02, 862.54, 862.55, 862.541

(56) References Cited

U.S. PATENT DOCUMENTS

| | | | |
|---|---|---|---|
| 4,069,435 A | 1/1978 | Wannerskog et al. | 310/168 |
| 4,175,430 A | 11/1979 | Morrison et al. | 73/862.55 |
| 4,203,319 A | 5/1980 | Lechler | 73/862.541 |
| 4,237,454 A | 12/1980 | Meyer | 340/682 |
| 4,341,122 A | 7/1982 | Lechler et al. | 73/862.045 |
| 5,129,742 A | 7/1992 | Tilch et al. | 384/448 |
| 5,140,849 A | 8/1992 | Fujita et al. | 73/593 |
| 5,226,736 A | 7/1993 | Becker et al. | 384/448 |
| 5,440,184 A | 8/1995 | Samy et al. | 384/446 |
| 5,503,030 A | * 4/1996 | Bankestrom | 73/862.54 |
| 5,642,105 A | * 6/1997 | Duffy et al. | 340/682 |
| 5,677,488 A | 10/1997 | Monahan et al. | 340/682 |
| 5,810,485 A | 9/1998 | Dublin, Jr. et al. | 384/626 |
| 5,952,587 A | * 9/1999 | Rhodes et al. | 73/862.541 |
| 6,324,899 B1 | * 12/2001 | Discenzo | 340/631 |

FOREIGN PATENT DOCUMENTS

| | | |
|---|---|---|
| EP | 288155 | 10/1988 |
| EP | 0571875 A1 | 5/1993 |
| EP | 0594550 A1 | 10/1993 |
| EP | 926501 | 6/1999 |
| WO | WO 9811356 | 3/1998 |

OTHER PUBLICATIONS

Wireless Data Corporation, Measurements From Rotating Equipment . . . Around the World.

(List continued on next page.)

Primary Examiner—Van Trieu
(74) Attorney, Agent, or Firm—Polster, Lieder, Woodruff & Lucchesi, L.C.

(57) ABSTRACT

A tapered roller bearing having its rollers arranged in two rows within an outer race and around an inner race contains a sensing device that radiates signals which reflect conditions within the bearing. In one embodiment, the outer race is unitary and the sensing device is wireless and self-powered and includes a mounting ring that is fitted to the outer race between the raceways along which the rollers roll. The ring has embedded within it several sensors for monitoring bearing conditions such as temperature and vibrations. The ring also contains a radio transmitter, a microprocessor to which the sensors are connected, and a power supply for producing the electrical energy required to operate the processor and the transmitter. The electric power is generated by means of electromechanical energy conversion using permanent magnets, armature winding and a target wheel that is captured between and rotates with the two cones. The transmitter converts conditions registered by the sensors and processed by the processor into radio signals which are received externally from the bearing. In another embodiment the unitary outer race has a groove which opens inwardly between the two rows of rollers, and the sensors, radio transmitter, processor, and power supply are located within the groove. In other embodiments the inner race is unitary and the sensors, radio transmitter, processor and power supply are carried by the inner race.

30 Claims, 5 Drawing Sheets

OTHER PUBLICATIONS

SAE Technical Paper Series, 911798, A Finite Element Method Analysis of Heavy Duty Axle Bearing Loads (Steve Masters, NSK Corp.).

Technology article, Issue Apr. 1995, Evolution (Gottfried Kurve, SKF Osterreich AG, Steyr, Austria.

EEE Instrumentation and Measurement Technology Conference, May 1997, Integrated Microsensor Module for a Smart Bearing with On–Line Fault Detection Capabilities.

* cited by examiner

BEARING WITH WIRELESS SELF-POWERED SENSOR UNIT

CROSS-REFERENCE TO RELALTED APPLICATIONS

None.

STATEMENT REGARDING FEDERALALY SPONSORED RESEARCH OR DEVELOPMENT

Not applicable.

BACKGROUND OF THE INVENTION

This invention relates in general to antifriction bearings and more particularly to an antifriction bearing that, under power derived from within the bearing, produces signals that reflect conditions associated with the bearing.

The typical antifriction bearing has inner and outer races provided with opposed raceways and rolling elements which are located between the races where they roll along the raceways when the bearing is set in operation, thereby reducing friction to a minimum. The bearing contains a lubricant and its ends are closed by seals to exclude contaminants from the interior of the bearing and of course to retain the lubricant in that interior. A bearing usually fails for lack of lubrication or by reason of a defect in one of its raceways or rolling elements. But the raceways and rolling elements are totally obscured and cannot be inspected without disassembling the bearing. This, of course, requires removing the bearing from that on which it is installed, whether it be a rail car journal, a vehicle axle, or a mill roll, to name a few.

Even so, a defect in an antifriction bearing will usually manifest itself in a condition that may be detected externally of the bearing, although not necessarily through a visual inspection. Typically a rise in temperature denotes a lack of lubrication, or perhaps, even a seizure in which both races turn and the antifriction bearing in effect becomes an unlubricated sleeve bearing. Spalling or other defects in the raceways or rolling elements may produce excessive vibrations in the bearing.

To be sure, devices exist for monitoring the operation of bearings. For example, railroads have trackside infrared sensors which monitor the journal bearings of passing trains, but they exist at a relatively few locations often many miles apart and will not detect the onset of a temperature rise occurring between such locations. Some bearings come equipped with their own sensors which are coupled to monitoring devices through wires. As a consequence, the race which carries the sensor for such a bearing must remain fixed, that is to say, prevented from rotating, lest the wires will sever. And with a railroad journal bearing, at least, the outer race preferably should remain free enough to "creep", that is rotate in small increments, so that wear is distributed evenly over the circumference of the outer raceway. Furthermore, preventing cup creep requires a costly locking mechanism.

BRIEF SUMMARY OF THE INVENTION

The preferred embodiment of the present invention resides in an antifriction bearing having inner and outer races and rolling elements between the races. The bearing also includes a wireless self-powered sensor unit having one or more sensors in communication with a radio transmitter located within the confines of the bearing. The radio transmitter transmits signals generated by an appropriate sensor that reflect certain operating conditions of the bearing, and the transmitter derives the electrical energy required to operate it from a power supply that is also located within the confines of the bearing.

BRIEF DESCRIPTION OF THE SEVERAL VIEWS OF THE DRAWINGS

In the accompanying drawings which form part of the Specification and wherein like numerals and letters refer to like parts wherever they occur.

DETAILED DESCRIPTION OF THE INVENTION

Figure 1:
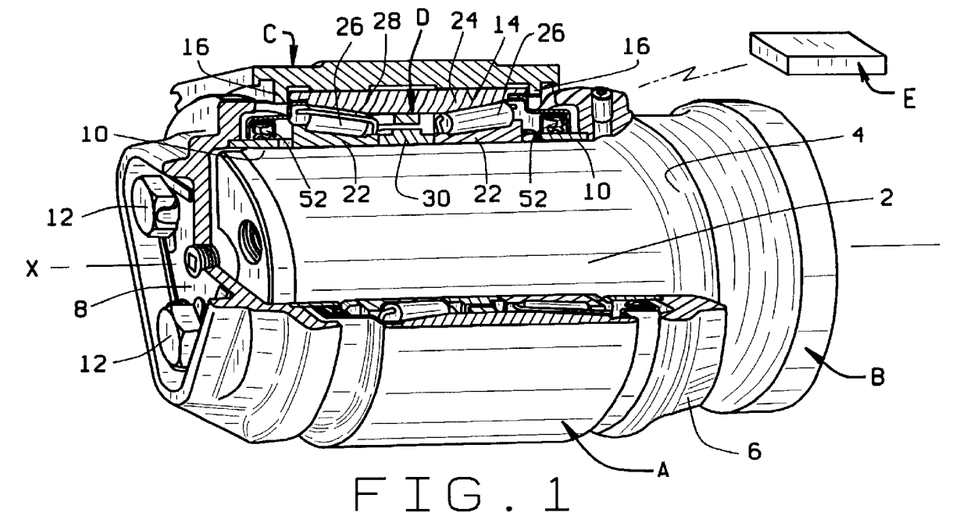
FIG. 1 is a perspective view, partially broken away and in section, of a bearing constructed in accordance with and embodying the present invention, with the bearing being fitted to a rail car journal and adapter.

Referring now to the drawings, a double row tapered roller bearing A enables a rail car axle B to rotate with minimum friction within an adapter C that is in turn fitted to a side frame on a rail car truck (FIG. 1). The bearing A preferably contains an internal sensor device or unit D which produces signals as the axle B rotates about an axis X on the bearing A. In the preferred embodiment, the sensor unit D is a self-powered and wireless and is disposed within the confines of the bearing A where it generates signals representative of conditions of the bearing A and operation, transmits information representative of the bearing condition and operating characteristics to a remote receiver E via wireless signal transmission. Thus, one at a location remote from the bearing A can, for example, determine angular velocity of the bearing A and the axle B, as well as operating temperatures for the bearing A, and the presence of excessive vibrations within the bearing A. Yet the bearing A and sensor unit D remains detached from the receiver E in the sense that no wires connect the bearing A or sensor unit D with the receiver E.

The axle B is conventional. At its end it has a (FIG. 1) journal 2 which merges into the remainder of the axle B at a fillet 4. The bearing A fits around the journal 2 between a backing ring 6 and an end cap 8, the former seating against the fillet 4 and the latter extending over the end face of the journal 2. Actually, the bearing A lies between two wear rings 10 which in turn abut the backing ring 6 and end cap 8, the entire arrangement being held on the journal 2 with cap screws 12 which pass through the end cap 8 and thread into the journal 2. The screws 12 urge the end cap 8 toward the end face of the journal 2, and the force so imparted is resisted at the fillet 4 against which the backing ring 6 seats. The force clamps the bearing A tightly between the wear rings 10.

The adapter C is in effect a housing which receives the bearing A. It has (FIG. 1) an arcuate bearing seat 14 and ribs 16 which project downwardly at the ends of the seat 14. The bearing A fits against the seat 14, to which it conforms, and the ribs 16 prevent it from shifting axially. But the bearing A is not keyed or otherwise fixed against rotation in the adapter C. The seat 14 extends circumferentially less than 180°.

The bearing A includes (FIG. 2) an inner race in the form of two cones 22, an outer race in the form of a double cup 24, and rolling elements in the form of tapered rollers 26 which are arranged in two rows between the cones 22 and cup 24, there being a separate row around each cone 22. Each row of rollers 26 has a cage 28 for maintaining the proper spacing between the rollers 26 of that row and for holding the rollers 26 around cone 22 for the row when the cone 22 is removed from the cup 24. The two cones 22 fit around the journal 2 as does a spacer ring 30 which occupies the space between the two cones 22. The cup 24 fits within the adapter C against the arcuate seat 14 and between the ribs 16.

Each cone 22 has (FIG. 2) a tapered raceway 32 that is presented outwardly away from the axis X and a thrust rib 34 and retaining rib 36 at the large and small ends, respectively, of the raceway 32. The thrust rib 34 runs out to a back face 38, whereas the retaining rib 36 runs out to a front face 40, and both the faces 38 and 40 are squared off with respect to the axis X. The wear rings 10 bear against the back faces 38 of the cones 22, urging the two cones 22 together and forcing their front faces 40 against the ends of the spacer ring 30. Thus, the spacer ring 30 establishes a prescribed spacing between raceways 32 on the two cones 22. Those raceways 32 taper inwardly toward the spacer ring 30.

The double cup 24 has a cylindrical exterior surface 42 that corresponds in curvature and length to bearing seat 14 of the adapter C. The cylindrical surface 42 runs out to end faces 44 which are squared off with respect to the axis X and lie opposite the ribs 16 at the ends of the bearing seat 14 so that the cup 24 is confined axially in the adapter C, but not circumferentially. Within its interior the cup 24 has tapered raceways 46 which surround the raceways 32 on the two cones 22. In addition, the cup 24 has a cylindrical intervening surface 48 between its two raceways 32, and it encircles the spacer ring 30 that fits between the two cones 22. The raceways 46 at their large ends open into end bores 50 which in turn open out of the end faces 44 of the cup 24. The end bores 50 receive seals 52 (FIG. 1) which establish live or dynamic fluid barriers along the wear rings 10.

Figure 2:
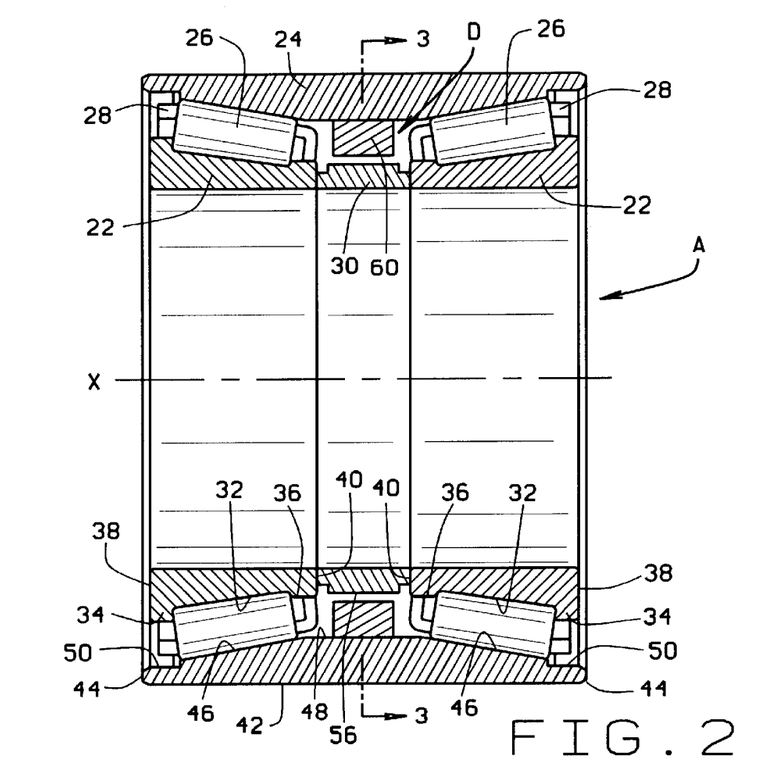
FIG. 2 is a longitudinal sectional view of the bearing.

The rollers 26 fit between the opposed raceways 32 and 46 of the cones 22 and cup 24, respectively, there being essentially line contact between the tapered side faces of the rollers 26 and the raceways 32 and 46. Moreover, the large end faces of the rollers 26 bear against the thrust ribs 34 of the cones 22, so the thrust ribs 34 prevent the rollers 26 from being expelled from the annular space between cones 22 and cup 24. The rollers 26 are on apex, meaning that the conical envelopes in which the side faces for the rollers 26 of a row lie, have their apices at a common point along the axis X.

When the axle B rotates, the cones 22 revolve within the cup 24. The rollers 26 roll along the raceways 32 and 46 of the cone 22 and cup 24, respectively. Since the rollers 26 are on apex, pure rolling contact exists between the tapered side faces of the rollers 26 and the raceways 32 and 46, and little friction develops along the raceways 32 and 46. But the large end faces of the rollers 26 slide and spin along the faces of the thrust ribs 34 which position the rollers 26 axially between the raceways 32 and 46 and prevent them from being expelled. If these regions of contact lack lubrication or suffer surface damage, excessive friction develops and along with it an increase in the temperature of the bearing A. Since the cup 24 is not keyed or otherwise secured against rotation in the adapter C, the minimal friction that does exist between the rollers 26 and the cup 24 imparts small incremental advances to the cup 24, or in other words, the cup 24 is permitted to creep circumferentially within the adapter C.

The self-powered sensor unit D generates electrical signals representative of the sensed parameters associated with conditions within the bearing A and operating characteristics of the bearing A. Data or parameterized values representative of the sensed signals are transmitted to the remote receiver E disposed outside the bearing A via wireless signal transmission, such as, for example, via electromagnetic waves associated with radio frequency (RF) signal transmission, to provide information necessary to properly evaluate the condition of the bearing A.

The sensor unit D can be adapted for monitoring a variety of parameters associated with the bearing A to provide information helpful in evaluating the operating characteristics and condition of the bearing A. The advantages of detecting temperature variations within the bearing A are discussed above. Other conditions maybe monitored as well. For example, the cyclic loading imposed by the rollers 26 on the raceways 32 and 46 of the cones 22 and cup 24 may lead to spalling along those raceways 32 and 46, or the tapered side faces of rollers 26. The presence of the spalls often results in excessive vibration, nominally periodic, being generated by the bearing A while in operation. Detection and evaluation of these vibrations can assist in diagnosing the condition of the bearing A. The rollers 26 not only affect the raceways 32 and 46, but further produce strain fields in the cones 22 and cup 24. These strain fields vary periodically and represent a source of useful information such as speed and load.

To generate electrical power, the preferred embodiment of the wireless, self-powered sensor unit D operates in conjunction with a target wheel which includes a plurality of teeth 56 (FIG. 3) arranged at equal circumferential intervals around the spacer ring 30. In this configuration, the target wheel rotates with the axle B, and the sensor unit D remains stationary with the cup 24. The teeth 56 are formed integral with the ring 30, which is manufactured from a ferrous metal such as steel, and serve to convert the spacer ring 30 into a target wheel. But the teeth 56 may form part of a separate target wheel that is fitted to the spacer ring 30. The outwardly presented surfaces of the teeth 56 describe a circle having its center at the axis X.

Considering the sensor unit D more specifically, it includes (FIG. 3) a mounting ring 60 which is preferably injection molded from a polymer and then pressed into the intervening surface 48 of the cup 24, although the ring 60 may be injection molded against the intervening surface 48 as well. Actually, the ring 60 may be manufactured from other nonferrous materials, aluminum being one such material. The mounting ring 60 has an inside surface 62 of cylindrical configuration with a gap existing between the circle described by the teeth 56 and the surface 62. The ring 60 contains a power supply 64, several sensors 66, a microprocessor 68, and a transmitter 70, all of which are embedded within the mounting ring 60 and likewise form part of the sensor unit D.

Figure 3:
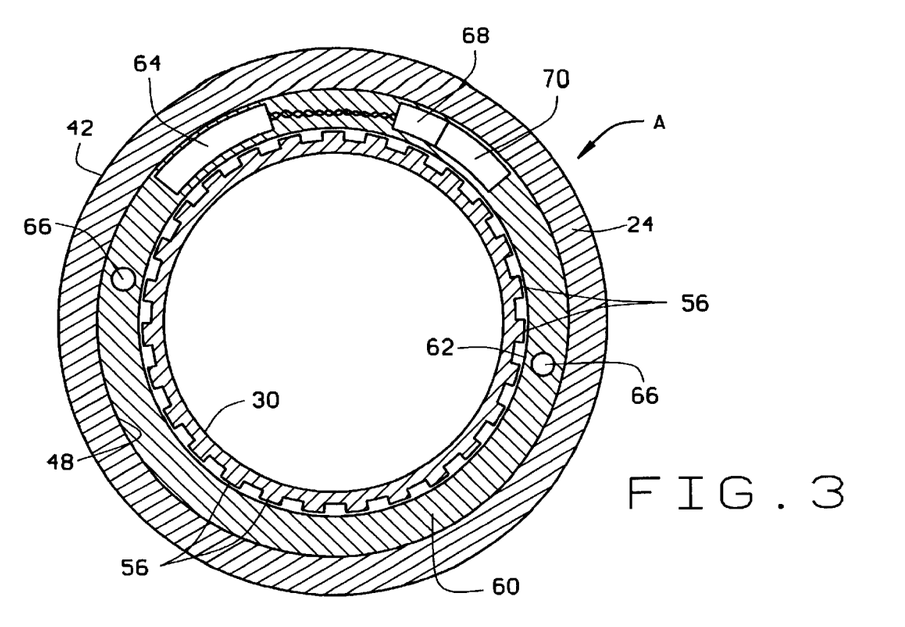
FIG. 3 is a transverse sectional view taken along line 3—3 of FIG. 2.

The power supply 64 preferably is a replenishable power supply. Since the sensor unit D is used in conjunction with the rotating bearing A, it is preferable to generate electrical power via electromagnetic induction. For example, the power supply 64 can be a variable reluctance electromagnetic generator that includes a magnetic core having a plurality of stationary permanent magnets arranged in succession in the circumferential direction, with their poles alternating. The power supply 64 further includes a winding encircling the magnetic core. The magnetic core produces a magnetic flux which passes through the winding and also passes through the air gap between the magnetic core and the nearby teeth 56 on the spacer ring 30. When the spacer ring 30 rotates, its teeth 56 move through the air gap between the alternating polarity poles, causing change in flux linkage with the winding and inducing voltage across the winding. The power supply 64 contains a full wave rectifier and a voltage regulator which converts the alternating current generated in the winding to direct current.

While electromagnetic induction is used in the preferred embodiment, other forms of power generation may be employed. For example, an alternative approach for generating necessary electrical energy can rely on the piezoelectric effect. More specifically, the vibratory motion of the bearing A as it acts upon a piezoelectric crystal (not shown) can be utilized as the power supply. Nominally, such a piezoelectric crystal is arranged with an attached seismic mass. When the piezoelectric crystal-mass experiences a vibratory motion, the periodic stressing of the crystal generates a periodic voltage via the piezoelectric effect. This periodic voltage can be used to charge a capacitor, and once charged, the capacitor supplies power to the electronic circuitry.

While the sensor unit D of the preferred embodiment is disposed internally within the confines of the bearing A generally between the raceways 46 of cup 24, it will be appreciated that the location of the sensor unit D can be varied to accommodate the particular application in which it is used. For example, the sensor unit D can be disposed at the exterior of the bearing A, if desired. In this arrangement, sensor unit D preferably is mounted on the exterior surface 42 of the double cup 24. The sensor unit D cannot detect the speed or generate power from a tone ring mounted on the spacer ring 30 in this location, but it can sense other parameters. The power supply 64 in such an arrangement preferably is a battery or utilizes piezoelectric power generation.

The sensors 66 monitor the operating conditions of the bearing A and generate signals representative of conditions in the bearing A. In the preferred embodiment, one sensor 66 monitors temperature and produces a signal representative of the temperature of the mounting ring 60. Another sensor 66 takes the form of an accelerometer, and it senses vibrations, producing a signal from which can be discerned not only the presence of vibrations, but their frequency and magnitude as well. Still another sensor 66 may measure strains in the cup 24. It will be appreciated that other sensors can be included in the sensor ring D to monitor other operating conditions, if desired, such as, for example, acoustic emission, lubricant analysis via conductive or chemical analysis, and displacement sensors.

The power supply 64, the sensors 66, the processor 68, and the transmitter 70 are all electrically connected through wires that are embedded within the ring 60. Through these wires the processor 68 and the transmitter 70 derive the electrical energy required for their operation, and the processor 68 also communicates with the several sensors 66. The sensors 66, power supply 64, transmitter 70 and processor 68 can each be separate modules that are interconnected via wires. Alternatively, these components all can be installed on a single printed circuit board that is mounted in the ring 60.

The processor 68 processes the signals received from the sensors 66 and communicates data representative of the sensed signals to the transmitter 70. The processor 68 can be programmed to evaluate signals received from the sensors 66 and generate an alarm signal when a signal from any one of the sensors 66 represents an unusual or deteriorating condition in the bearing A, the alarm signal being transmitted to the receiver E via the transmitter 70. It should be noted, however, that while autonomous alarm conditions at the bearing level are possible, determination of alarm conditions also can take place at the receiver E end. The processor 68, being coupled to the power supply 64, also produces a signal that reflects angular velocity. The transmitter 70 converts the signals from the processor 68 to radio frequency, and radiates them as electromagnetic waves from an antenna that is likewise embedded within the ring 60. Hence, the antenna also lies within the confines of the cup 24, and the cup 24 does not require any special alterations to accommodate it. The transmitter 70 of the preferred embodiment is a microtransmitter having the capacity for spread spectrum modulation and providing radiated power levels up to one (1) Watt as permitted in FCC regulation Port 15.247.

The receiver E is tuned to the radio frequency of the transmitter 70 for the sensor ring D and receives the signals produced by the transmitter 70. It too may process the signals.

Among the conditions which the sensors 66 monitor in the preferred embodiment is temperature. As discussed above, the lack of adequate lubrication in the bearing A produces excessive friction, primarily where the large end faces of the rollers 26 slide and spin along the thrust ribs 34 of the cones 22, and the greater friction causes the temperature of the bearing A to rise. The temperature sensor 66 registers this rise, and the processor 68 transmits data representative of the sensed temperature to the receiver E via the transmitter 70. In one embodiment of the present invention, the processor 68 can be programmed to detect when the sensed temperature exceeds a prescribed magnitude, and to generate an alarm signal which the transmitter 70 sends to the receiver E.

Another situation, which can result in a rapid and excessive temperature rise of the bearing A, occurs as a result of extreme degradation of the bearing A, most notably the cones 22. This degradation can result in one or more of the rollers 26 or the cage 28 becoming lodged between the raceways 46 and 32, effectively terminating the intended rolling motion of the rollers 26. In such a situation, the rollers 26 can begin to slide on the cup raceway 46, or cone raceway 32, with the resulting friction causing a rise in bearing temperature. In a more severe situation, the effected cone 22 and cup 24 may seize, causing the effected cone 22 to slide on the journal 2. Regardless of the type of sliding motion, the resulting friction between the sliding contacts results in rapid elevation in temperature of the bearing A, and the temperature sensor 66 detects this temperature rise. Again, such temperature increases as detected by the sensor 66 is transmitted to the receiver E via the processor 68 and transmitter 70.

As discussed above, spalling along one or more of the raceways 32 and 46 or along the tapered side faces of one or more of the rollers 26 will set up, in the bearing A, vibrations that exceed those commonly identified with the operation of the bearing A. A crack or flat on one of the rollers 26 will do the same. In the preferred embodiment, the vibration sensor 66, which is really an accelerometer, registers these vibrations, and the processor 68 acquires the vibration signals generated by the vibration sensor 66. The acquired vibration signal, or a parameterized representation thereof, is communicated to the receiver E via the transmitter 70. In one embodiment of the present invention, the processor 68 can be programmed to recognize when the acquired vibration signals exceed a prescribed magnitude. In this situation, the processor 68 generates an alarm signal reflecting excessive vibration that is transmitted to the receiver E via the transmitter 70. However, in the preferred embodiment, the alarm condition decision is not made at the bearing level, but rather by a processor at the receiver E.

Strains in the cup 24 reflect loads imposed by the rollers 26 on the cup 24 and thus represent the magnitude of the load to which the bearing A is subjected. The strain sensor 66 of the preferred embodiment, which is bonded to the intervening surface 48 of the cup 24, yet is embedded in the ring 60, measures such strains and produces a signal which reflects the magnitude of the strains. That signal is delivered to the processor 68 which generates data representative of the measured strains for transmission to the receiver E via the transmitter 70.

The teeth 56 on the rotating spacer ring 30 induce an electrical potential in the power supply 64 that is embedded in the ring 60, and that potential is alternating in character. Its frequency reflects the angular velocity of the cones 22 and likewise of the angular velocity of the axle B. The processor 68 translates that frequency into angular velocity, and the transmitter 70 produces a signal that represents the angular velocity at any time. These signals are then sent by the transmitter 70 to the remote receiver E.

In this regard, a brake at a wheel on the car axle B may fail to release, so that when the rail car is set in motion as part of a train, the axle B will not rotate or else will rotate at a velocity less than the other axles on the rail car. The velocity signal produced by the transmitter 70 for the bearing A at the wheel reflects the reduced velocity.

In lieu of the magnets and windings, the power supply 64 may take the form of a long-life battery or the power supply 64 may include a battery along with the magnets, winding, and rectifier, with the battery providing the electrical energy to power the processor 68 and transmitter 70 when the axle B is at rest. In this regard, to conserve power, the processor 68, after sensing the absence of rotation for a prescribed period, such is several hours, may in effect shut itself off and activate only periodically, simply to show that the sensor unit D is still functional. Once the axle B begins to rotate, the processor 68 reactivates with signals derived from the power supply 64 and then derives its energy from the electromotive force induced in the winding of the power supply 64.

Figure 4:
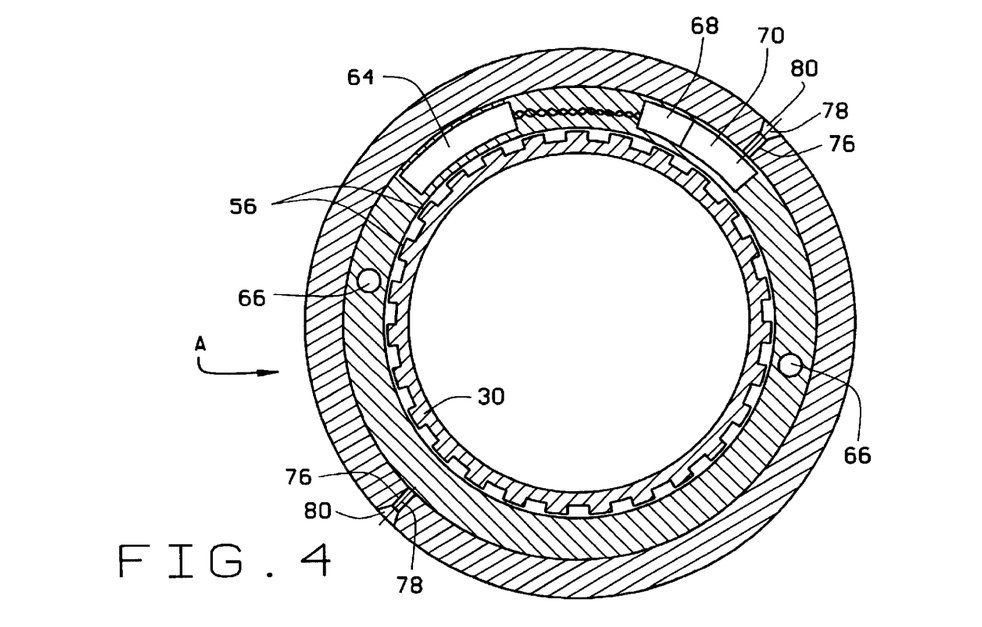
FIG. 4 is a transverse sectional view of a bearing with its cup modified to accommodate antenna.

Even though the antenna for the transmitter 70 resides entirely within the confines of the cup 24, the signal that it produces escapes from the cup 24 and is picked up by the receiver E. But a stronger signal will emanate from the bearing A when the radiating antenna has access to free space. To this end, the cup 24 may contain two or more radially directed bores 76 (FIG. 4) located between its ends so as to open into the interior of the cup 24 at the intervening surface 48. The cup 24 shown in FIG. 4 includes two bores 76 located midway between its ends. The two bores 76 are located approximately 180° apart so that when one is covered by the bearing seat 14 of the adapter C, the other is exposed beyond the adapter C. Each bore 76 contains an RF radiator 78—in other words, an antenna—and a potting compound 80 in which the radiator 78 is embedded.

Figure 5:
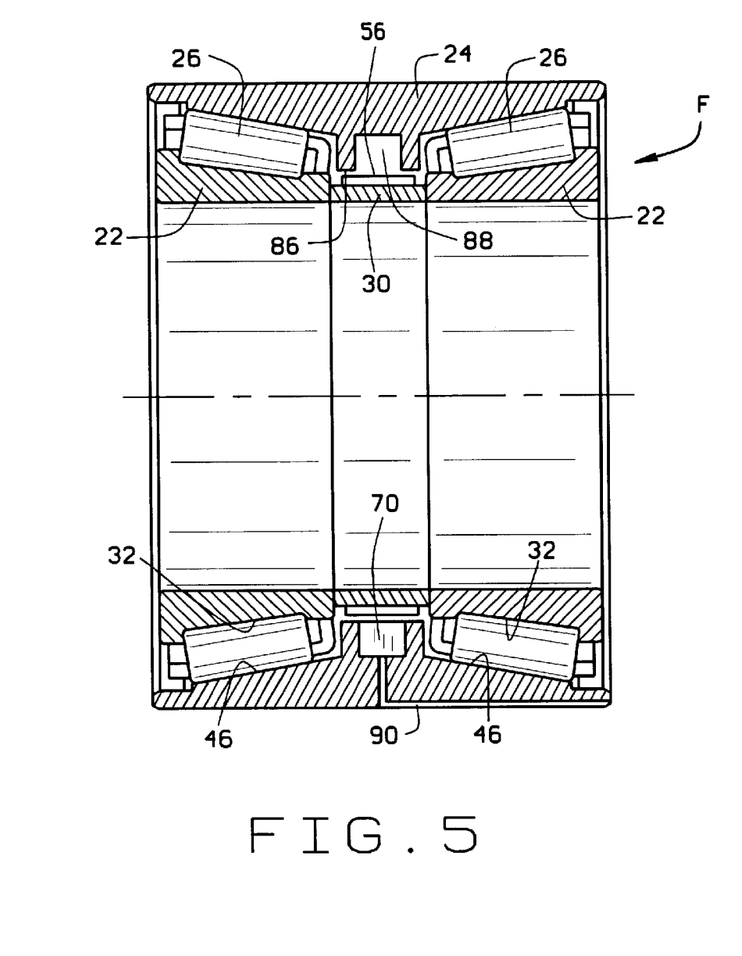
FIG. 5 is a sectional view of a modified bearing embodying the present invention.

A modified bearing F (FIG. 5) is quite similar to the bearing A and as such has two cones 22, a double cup 24 which surrounds the cones 22, and tapered rollers 26 arranged in two rows between raceways 32 and 46 on the cones 22 and cup 24, respectively. The two cones 22 are separated by a spacer ring 30 having teeth 56 along its periphery The bearing F differs from the bearing A in that the cup 24 of the bearing F has a rib 86 that is located between the small ends of the raceways 46 where it projects inwardly beyond the raceways 46 and toward the spacer ring 30, but does not interfere with the teeth 56 on the ring 30. The rib 86 extends the full circumference of the cup 24 and has groove 88 which opens out of it toward the spacer ring 30. The groove 88 likewise extends the full circumference of the cup 24.

Figure 6:
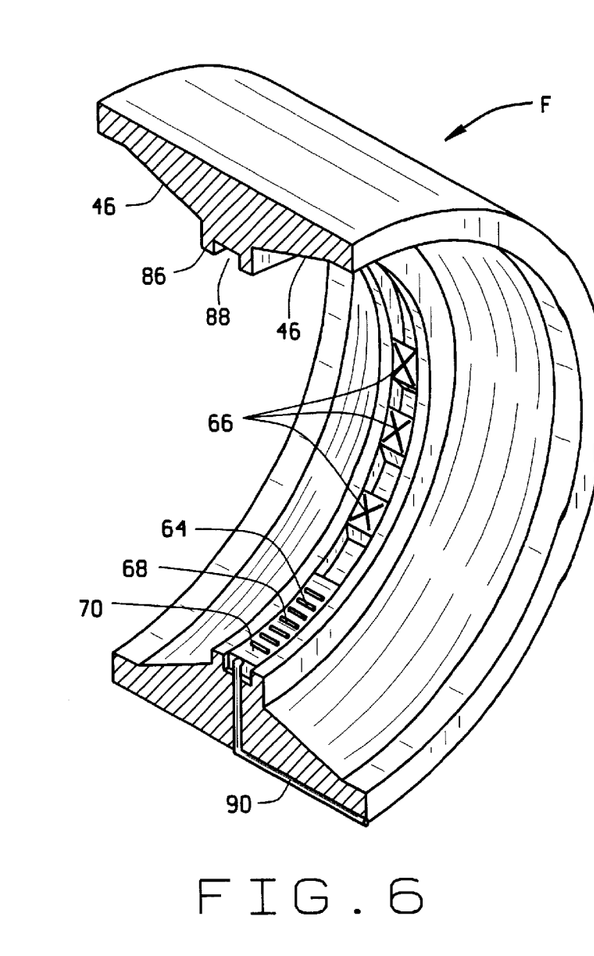
FIG. 6 is a perspective view, partially broken away and in section, of the double cup for the modified bearing.

The groove 88 contains (FIG. 6) the power supply 64, several sensors 66 which produce signals responsive to operating conditions of the bearing F, the processor 68, and the radio transmitter 70. The transmitter 70 for the bearing F is connected to a RF radiator 90 that extends through the cup 24 and lies near the exterior surface of the cup 24.

The mounting ring 60 for the bearing A may be located on the spacer ring 30 and the teeth 56 between the raceways 46 of the cup 24. Likewise, the rib 86 and groove 88 for the bearing F may be located on the spacer ring 30 and of course the power supply 64, the sensors 66, the processor 68 and the transmitter 70 as well.

Another modified bearing G (FIG. 7) differs from the bearings A and F in that its inner race is unitary, not its outer race, and the unitary inner race carries the power supply 64, the sensors 66, the processor 68 and the transmitter 70 as well as the RF radiator 78. In this embodiment, either the inner race or the outer race can rotate depending upon the intended use. More specifically, the bearing G includes an inner race in the form of a unitary or double cone 102, an outer race in the form of a two cups 104, rolling elements in the form of tapered rollers 106 arranged in two rows between the cone 102 and cups 104, cages 108 fitted to the rollers 106, and a spacer ring 110 located between the two cups 104. The tapered rollers 106 are organized in the direct configuration, that is with the large ends of the rollers 106 for the two rows presented toward each other.

Figure 7:
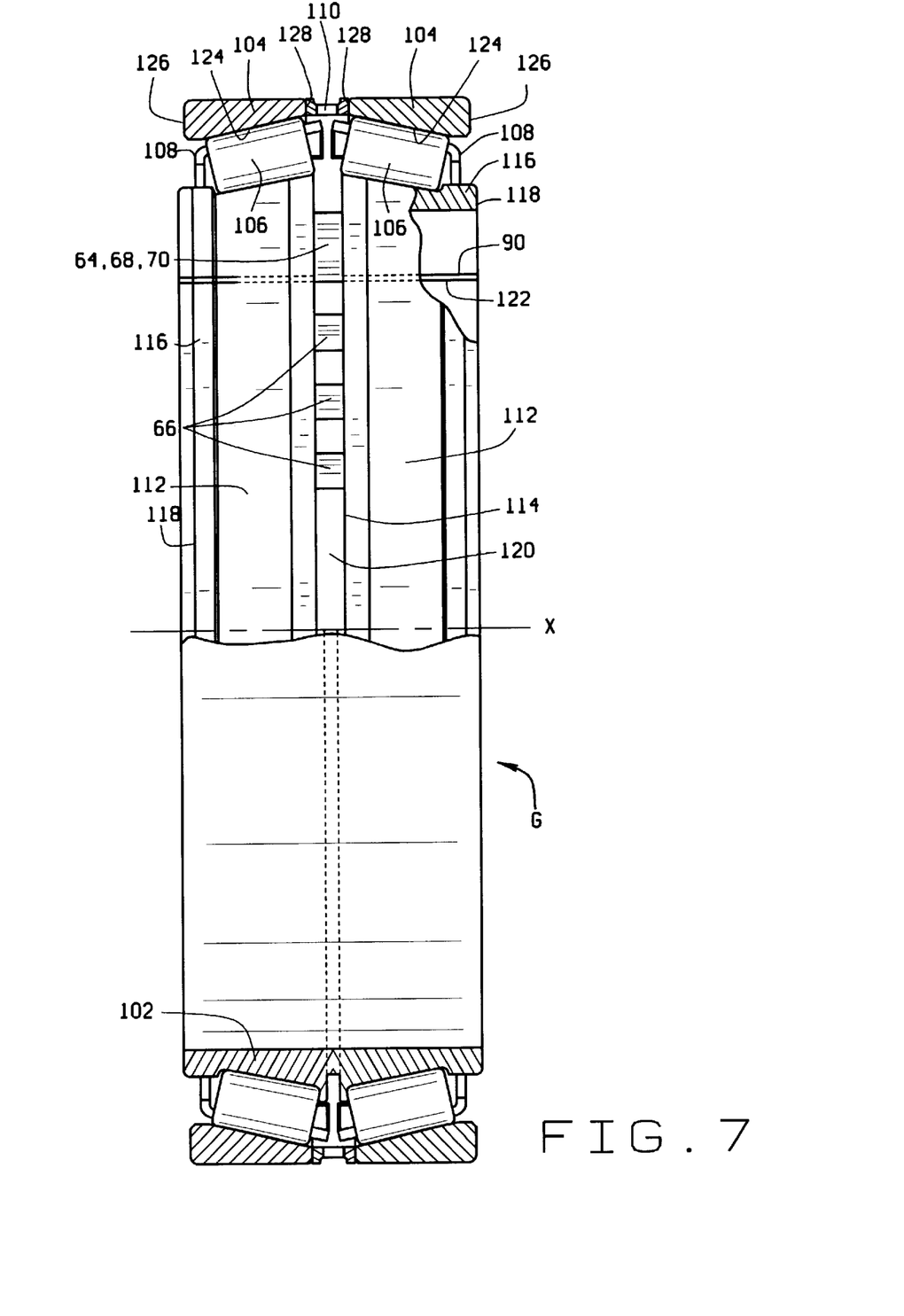
FIG. 7 is an elevational view, partially broken away and in section, of another modified bearing of the present invention.

The cone 102 has tapered raceways 112 which lead up to a thrust rib 114 that separates the raceways 112, the raceways 112 having their greatest diameters at the rib 114. At the opposite or small diameters of the raceways 112, the cone 102 has retaining ribs 114 which lead out to end faces 118 that are squared off with respect to the axis X and form the ends of the cone 102. The rib 114 contains a groove 120 which opens outwardly away from the axis X. The cone 102, along its inside face, that is, along the cone bore, has an axially directed groove 122, one end of which communicates with the circumferential groove 120 in the rib 114. The axial groove 122 extends out to one of the end faces 118.

Each cup 104 has a tapered raceway 124 which is presented inwardly toward the axis X and lies between a back face 126 and a front face 128, with the former being at the small end of the raceway 124 and the latter being at the large end of the raceway 124. The back faces 126 form the ends of the bearing G, while the front faces 128 abut the spacer ring 110. The two cups 104 surround different raceways 112 on the cone 102, so beyond each cone raceway 112 lies a cup raceway 124.

The tapered rollers 106 occupy the annular spaces between the cone raceways 112 and the cup raceways 124 and are thus arranged in two rows. Each row has its own cage 108 which maintains the proper spacing between the rollers 106 of the row. The tapered side faces of the rollers 106 contact the raceways 112 and 124, whereas the large end faces of the rollers 106 bear against the thrust rib 114 between the ends of the cone 102. The rollers 106 of the two rows are on apex. The width of the spacer ring 110 controls the spacing between the cup raceways 124 and hence the setting for the bearing G.

The groove 120 in the thrust rib 114 contains the power supply 64, the sensor 66, the processor 68 and the transmitter 70. Indeed, the transmitter lies immediately outwardly from the RF radiator 78 which extends through the groove 120. The power supply 64 for the bearing G takes the form of a battery, but it may also take the form of a variable reluctance electromagnetic generator. The latter would require teeth carried by the spacer ring 30 to actuate it, with such teeth being similar to the teeth 56 on the spacer ring 30 of the bearing A.

The bearing G in contrast to the bearings A and F senses conditions at the rotating component, that is at the unitary cone 102.

Figure 8:
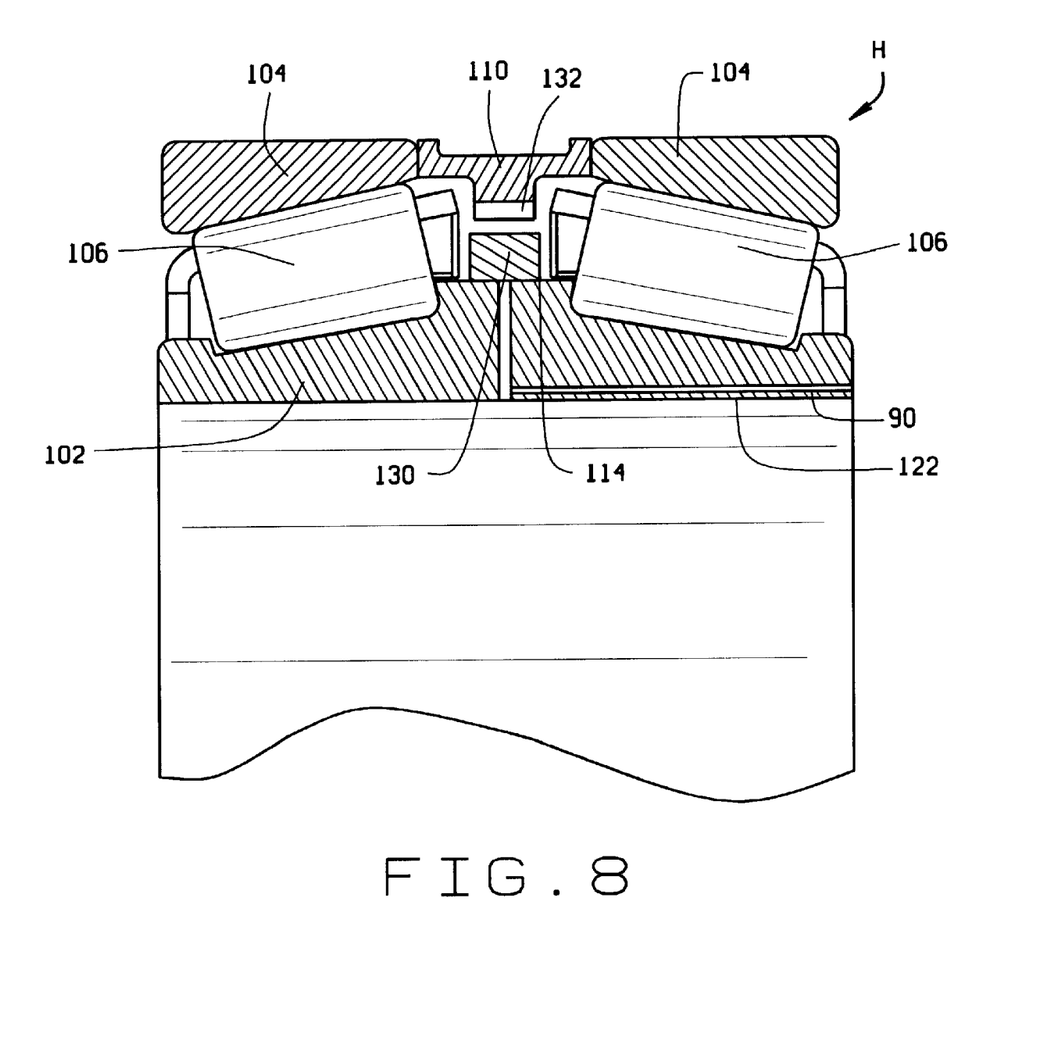
FIG. 8 is a fragmentary sectional view of still another modified bearing.

Still another modified bearing H (FIG. 8) is quite similar to the bearing G in that the power supply 64, the sensor 66, the processor 68 and the transmitter 70 are carried by the inner race, that is the unitary or double cone 102, with either the inner race or outer race rotating upon rotation of the axle. However, the thrust rib 114 on the cone 102 is wider and lacks the groove 120. The rib 114 supports a mounting ring 130 which fits snugly around it. Like the mounting ring 60, the ring 130 may be formed from a polymer or a nonferrous material. The power supply 64, the sensors 66, the processor 68 and the transmitter 70 are all embedded within the ring 130. Where the power supply 64 takes the form of the variable reluctance electromagnetic generator 64, the spacer ring 110 that separates the cups 104 should have teeth 132 to transform it into a target wheel which interrupts the magnetic flux produced by the generator 64.

While the bearings A, F, G and H here discussed form part of rail cars, the bearings A, F, G and H have utility in other equipment as well. For example, they may be used on a truck axles, or to support the rolls of mills. In other examples, bearings F, G, and H can be used in locomotives instead of rail cars.

This invention is intended to cover all changes and modifications of the example of the invention herein chosen for purposes of the disclosure which do not constitute departures from the spirit and scope of the invention.

What is claimed is:

1. An antifriction bearing for facilitating rotation about an axis; said bearing comprising:
    an inner race having a raceway which is presented outwardly away from the axis;
    an outer race having a raceway which is presented inwardly toward the axis and surrounds the raceway of the inner race;
    rolling elements located in a row between the raceways of the inner and outer races; and
    a sensor unit carried by and fixed in position with respect to one of the races and located entirely within the confines of the outer race, the sensor unit including at least one sensor for monitoring a condition of the bearing and generating a signal representative of that condition, a microprocessor for processing the signal from the sensor and producing a processed signal, a transmitter for converting the processed signal into a radio frequency signal representative of the condition monitored, and a power supply connected to the processor and the transmitter and providing electrical energy for the operation of the processor and transmitter, the transmitter having an antenna that is entirely within the confines of the outer race.

2. An antifriction bearing according to claim 1 wherein the sensor unit is carried by the outer race.

3. An antifriction bearing according to claim 1 wherein the sensor unit is carried by the inner race.

4. An antifriction bearing according to claim 1 wherein the inner and outer races each have two raceways which are spaced apart axially; wherein the rolling elements are organized in two rows between the raceways of the inner and outer races; and wherein the sensor unit is between the two rows of rolling elements.

5. An antifriction bearing according to claim 4 wherein the sensor unit further includes a ring which is fitted to said one race and the sensor, processor, transmitter and power supply are located within the ring.

6. An antifriction bearing according to claim 1 and further comprising a target wheel fixed in position with respect to the other race, the power supply and the target wheel being such that when relative rotation occurs between the races, the power supply produces electrical energy.

7. An antifriction bearing according to claim 6 wherein the power supply produces a magnetic field and the target wheel has teeth which pass through and disrupt the magnetic filed when relative rotation occurs between the races.

8. An antifriction bearing according to claim 1 wherein the power supply is a battery.

9. An antifriction bearing according to claim 1 wherein the power supply is a piezoelectric device.

10. An antifriction bearing according to claim 1 wherein the power supply generates electrical energy by electromagnetic induction.

11. An antifriction bearing according to claim 1 wherein the sensor responds to temperature.

12. An antifriction bearing according to claim 1 wherein the sensor responds to vibrations.

13. An antifriction bearing according to claim 1 wherein the outer race includes a unitary cup having a pair of tapered raceways that are spaced axially; wherein the inner race includes a pair of cones, each having a tapered raceway that is presented toward one of the raceways on the cup; and wherein the rolling elements are tapered rollers arranged in two rows, one around each cone, and contacting the raceways on the cones and cup.

14. In combination with the antifriction bearing of claim 13, a journal over which the cones fit, seal wear rings located around the journal beyond each cone and seals fitted to the ends of the cup and establishing dynamic fluid barriers with the wear rings.

15. An antifriction bearing for facilitating rotation about an axis, said bearing comprising;
    an inner race having a raceway which is presented outwardly away from the axis;
    an outer race having a raceway which is presented inwardly toward the axis and surrounds the raceway of the inner race;
    rolling elements located in a row between the raceways of the inner and outer races;
    a mounting ring mounted in a fixed position on said one race;
    at least one sensor carried by the mounting ring for monitoring a condition of the bearing and generating a signal representative of that condition;

a microprocessor carried by the mounting ring for processing the signal from the sensor and producing a processed signal;

a transmitter carried by the mounting ring for converting the processed signal into a radio frequency signal representative of the condition monitored; and a power supply carried by the mounting ring and providing electrical energy for the operation of the processor and the transmitter.

16. An antifriction bearing according to claim 15 wherein the sensor, processor, transmitter and power supply are all embedded in the ring.

17. An antifriction bearing according to claim 16 wherein the ring is formed from a polymer.

18. An antifriction bearing according to claim 15 wherein the inner and outer races each have two raceways which are spaced apart axially; wherein the rolling elements are organized in two rows between the raceways of the inner and outer races; and wherein the ring is between the two rows of rolling elements.

19. An antifriction bearing according to claim 18 wherein the mounting ring is fitted to and carried by the outer race between the raceways of the outer race.

20. In combination with the antifriction bearing of claim 19, a journal over which the inner race fits, seal wear rings located around the journal beyond the inner race, and seals fitted to the ends of the outer race and establishing dynamic fluid barriers with the wear rings.

21. An antifriction bearing according to claim 18 wherein the mounting ring is fitted to and carried by the inner race between the raceways of the inner race.

22. An antifriction bearing according to claim 18 and further comprising a target wheel fixed in position with respect to the other race, the power supply and the target wheel being such that when relative rotation occurs between the races, the power supply produces electrical energy.

23. An antifriction bearing according to claim 22 wherein the power supply produces a magnetic field and the target wheel has teeth which pass through and disrupt the magnetic field when relative rotation occurs between the races.

24. An antifriction bearing according to claim 15 wherein the mounting ring is located around the outer race.

25. An antifriction bearing according to claim 15 wherein the power supply is a battery.

26. An antifriction bearing according to claim 15 wherein the power supply is a piezoelectric device.

27. An antifriction bearing according to claim 15 wherein the power supply generates electrical energy by electromagnetic induction.

28. An antifriction bearing according to claim 15 wherein the sensor responds to temperature.

29. An antifriction bearing according to claim 15 wherein the sensor responds to vibrations.

30. An antifriction bearing for facilitating rotation about an axis, said bearing comprising:

an outer race provided with a pair of raceways which are presented inwardly toward the axis;

an inner race having a pair of raceways which are presented outwardly away from the axis and toward the raceways of the outer race;

rolling elements organized in two rows between the raceways of the outer and inner races;

a ring fitted to the outer race within the outer race, between the raceways of the outer race;

a power supply on the ring and being capable of producing a signal that reflects angular velocity of one race rotating relative to the other race in addition to producing electrical energy; and a transmitter carried by the outer race and connected to the power supply for producing a radio frequency signal that reflects the angular velocity.

* * * * *